United States Patent
Zhang et al.

(10) Patent No.: US 12,276,605 B1
(45) Date of Patent: Apr. 15, 2025

(54) DETECTION AND ANALYSIS METHOD FOR RAPID DELINEATION OF AGING STAGES OF STYRENE-BUTADIENE-STYRENE MODIFIED ASPHALT

(71) Applicant: Huazhong University of Science and Technology, Hubei (CN)

(72) Inventors: Derun Zhang, Hubei (CN); Peixin Xu, Hubei (CN); Ziyang Liu, Hubei (CN); Dongxing Luan, Hubei (CN); Zheng Liu, Hubei (CN); Yichen Guo, Hubei (CN); Pei Yu, Hubei (CN); Jinbiao Tang, Hubei (CN); Qisheng Hu, Hubei (CN); Chenhui Peng, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/929,538

(22) Filed: Oct. 28, 2024

(30) Foreign Application Priority Data

Oct. 30, 2023 (CN) .......................... 202311415314.3

(51) Int. Cl.
*G01N 21/35* (2014.01)
*G01N 21/3563* (2014.01)
*G01N 21/3577* (2014.01)

(52) U.S. Cl.
CPC ..... *G01N 21/3563* (2013.01); *G01N 21/3577* (2013.01); *G01N 2223/345* (2013.01)

(58) Field of Classification Search
CPC ........... G01N 21/3563; G01N 21/3577; G01N 2223/345
See application file for complete search history.

(56) References Cited

U.S. PATENT DOCUMENTS

2020/0165459 A1* 5/2020 Williams ................ E01C 7/265

FOREIGN PATENT DOCUMENTS

| CN | 110987855 A | 4/2020 |
| CN | 113029822 A | 6/2021 |

OTHER PUBLICATIONS

Kleiziene et al., Effect of Aging on Chemical Composition and Rheological Properties of Neat and Modified Bitumen, MDPI, materials, Nov. 4, 2019; Accepted: Nov. 29, 2019; Published: Dec. 5, 2019; 4066 (Year: 2019).*

* cited by examiner

*Primary Examiner* — Hugh Maupin

(57) ABSTRACT

The present disclosure provides a detection and analysis method for rapid delineation of aging stages of styrene-butadiene-styrene (SBS) modified asphalt, including the following steps: performing a Fourier transform infrared spectroscopy (FTIR) test on unaged SBS-modified asphalt samples to obtain a copolymer index of $I_{BO/SO}$ and neat asphalt functional group indexes, including the $SI_O$, $I_B$, $aI_O$, $ARI_O$, and $CI_O$; performing the FTIR test on the aged SBS-modified asphalt samples to obtain an actual index of $I_{B/S}$, SI, $I_B$, $_aI$, ARI, and CI; and delineating three aging stages of SBS-modified asphalt, including a polymer swelling stage, a polymer degradation stage and a component imbalance stage according to changes of functional group indexes. According to the present disclosure, the actual aging stages of the SBS-modified asphalt can be determined rapidly and accurately, providing a reasonable basis for the decision on pavement maintenance timing and mode.

6 Claims, 3 Drawing Sheets

DETECTION AND ANALYSIS METHOD FOR RAPID DELINEATION OF AGING STAGES OF STYRENE-BUTADIENE-STYRENE MODIFIED ASPHALT

CROSS-REFERENCE TO RELATED APPLICATION

This application claims priority of Chinese Patent Application No. 202311415314.3, filed on Oct. 30, 2023, the entire contents of which are incorporated herein by reference.

TECHNICAL FIELD

The present disclosure relates to the technical field of road engineering, particularly a detection and analysis method for rapid delineation of aging stages of styrene-butadiene-styrene (SBS) modified asphalt.

BACKGROUND

SBS has a unique three-dimensional cross-linked network molecular structure, which can effectively improve the rutting resistance at high temperatures, cracking resistance at low temperatures, and reduce the temperature sensitivity of neat asphalt. Therefore, SBS-modified asphalt has been used worldwide in the middle and upper layers of asphalt pavement. Normally, the SBS-modified asphalt is fabricated at a high temperature. In order to fully dissolve and disperse the SBS copolymer, it is necessary to add the SBS copolymer into the neat asphalt at 180° C. for shearing and stirring, and subsequently swelling at 170° C. for about 24 hours totally. Obviously, such high-temperature conditioning can easily induce the aging degradation of both SBS copolymer and neat asphalt. In addition, the SBS-modified asphalt pavement will be inevitably aged due to the influence of environmental factors, including oxygen and ultraviolet aging under the in-service conditions, further resulting in the degradation of SBS copolymer and the imbalance of asphalt four key components. The latter includes the increase of macromolecular asphaltene component and the decrease of light aromatic component. These dual aging effects will lead to the deterioration of the performance of SBS modified asphalt, leading to various pavement diseases, reducing driving safety and comfort, and shortening the fatigue life of asphalt pavement.

As different from that of neat asphalt, the aging evolution of SBS-modified asphalt can be roughly delineated into three stages: (1) Stage I dominated by SBS polymer swelling, (2) Stage II dominated by SBS polymer degradation, and (3) Stage III dominated by imbalance of asphalt four key components. These three stages represent that the aging degree gradually deepens, accompanied by the deterioration of pavement performance. Therefore, it is significantly important to rapidly detect and accurately identify the three aging stages of the SBS-modified asphalt, and proactively take effective anti-aging measures to prolong the durability of the SBS-modified asphalt. For example, the SBS copolymer linker is added to the aged SBS-modified asphalt in Stage II, while the SBS copolymer linker and neat asphalt rejuvenator are added simultaneously in Stage III, for a timely recovery of the performance of aged SBS-modified asphalt. Due to its simplicity and fastness, the attenuated total internal reflectance (ATR) module of Fourier transform infrared spectroscopy (FTIR) detection device has been widely employed to quantify the aging degree of the asphalt through detecting the functional group changes during the aging stages. However, the ATR test module is only suitable for liquid and powder samples and can only detect 1-2 microns of the samples. In addition, the test results fluctuate significantly due to the scattering effect, and the functional group changes resulted from the asphalt aging can only be accurately captured after multiple repeated tests.

Chinese invention patent CN110987855A provides a method for rapidly detecting asphalt aging based on ATR-FTIR, which includes the following steps: obtaining reclaimed asphalt pavement (RAP) aged asphalt by extracting and centrifuging the asphalt mixture sampled by core drilling on the in-service asphalt pavement, detecting and calculating sulfoxide index and carbonyl index of RAP asphalt by using an ATR-FTIR testing module to evaluate the aging degree of asphalt. However, the core drilling sampling of asphalt pavement not only has a heavy workload but also affects transportation efficiency and destroys the overall stability of asphalt pavement structure. It is challenging to eliminate trichloroethylene dissolving agent from the extracted asphalt, which significantly affects the testing accuracy of FTIR. It is impossible to determine the aging degradation of SBS copolymer and fully characterize the aging stages of SBS-modified asphalt only by a single sulfoxide index and carbonyl index (the aging index of neat asphalt). Patent CN113029822A provides a method for monitoring the aging degree of in-service SBS-modified asphalt pavement. The fitting equations of extractable bitumen ductility and carbonyl/aromatic index are established to determine the aging degree of asphalt. Still, the infrared spectrum aging characteristic functional groups of SBS copolymer are not considered, which can only reflect the aging situation of neat asphalt. Patent CN110455740A also provides a prediction and evaluation method for detecting and calculating the aging function of neat asphalt by FTIR, but the technique does not apply to SBS-modified asphalt. Patent CN111426650A provides an evaluation method for the aging law of SBS-modified asphalt, involving the SBS copolymer in SBS-modified asphalt before and after aging is separated, the methyl index and butadiene index (SBS copolymer aging indexes) of SBS before and after aging are calculated, and the aging degradation of SBS copolymer is evaluated. Still, the aging stages of neat asphalt in modified asphalt cannot be fully characterized only by analyzing the infrared spectrum of SBS copolymer. Patent CN113092312A and patent CN111739593A provide that FTIR is used to detect the infrared spectra of RAP asphalt, and laboratory-fabricated SBS-modified asphalt, carbonyl index, and butadiene index are calculated. The aging degree of asphalt is evaluated, but the change of styrene block in SBS copolymer during aging evolution is neglected. The quantitative evaluation index cannot determine the aging stage of SBS-modified asphalt.

SUMMARY

Given the deficiency of the prior art, the present disclosure provides a detection and analysis method for rapid delineation of aging stages of SBS-modified asphalt. Three aging stages of SBS-modified asphalt are delineated according to the functional group changes of infrared spectrum characteristic of SBS copolymer and neat asphalt. Different forms of SBS-modified asphalt are detected using corresponding FTIR detection modules, and the actual aging stages of SBS-modified asphalt is delineated according to aging functional group indexes calculated by actual detection. This method eliminates the need for large-scale core drilling sampling, and feature simple steps and high detection accuracy.

To achieve the above objective, the present disclosure provides the following technical solutions.

A detection and analysis method for rapid delineation of aging stages of SBS-modified asphalt includes the following steps:

(1) performing an FTIR test on unaged SBS-modified asphalt samples, detecting the absorbance of infrared spectrum characteristic functional groups polystyrene and polybutadiene of unaged SBS-modified asphalt at 699 cm$^{-1}$ and 966 cm$^{-1}$, calculating a value of $A_{699}/A_{966}$, and recording the value as an unaged SBS copolymer index $I_{B0/S0}$; and detecting the absorbance of the unaged SBS-modified asphalt at 1030 cm$^{-1}$, 1456 cm$^{-1}$, 1600 cm$^{-1}$, and 1700 cm$^{-1}$, calculating functional group indexes of sulfoxide group, aliphatic group, aromatic group and carbonyl of the unaged SBS-modified asphalt, and recording the same as indexes of unaged neat asphalt $SI_0=A_{1030}/\Sigma A_{650-2000}$, $I_{B,a}I_0=A_{1456}/\Sigma A_{650-2000}$, $ARI_0=A_{1600}/\Sigma A_{650-2000}$, and $CI_0=A_{1700}/\Sigma A_{650-2000}$;

$A_{699}$, $A_{966}$, $A_{1030}$, $A_{1456}$, $A_{1600}$, and $A_{1700}$ referring to corresponding peak areas at infrared spectrum wave numbers of 699 cm$^{-1}$, 966 cm$^{-1}$, 1030 cm$^{-1}$, 1456 cm$^{-1}$, 1600 cm$^{-1}$, and 1700 cm$^{-1}$, and $\Sigma A_{650-2000}$ referring to a sum of peak areas at infrared spectrum wave numbers of 650 cm$^{-1}$–2000 cm$^{-1}$;

(2) performing the FTIR test on laboratory-fabricated SBS-modified asphalt samples or in-service SBS-modified asphalt pavement samples; detecting the absorbance of the laboratory-fabricated SBS-modified asphalt or in-service SBS-modified asphalt pavement samples at 699 cm$^{-1}$ and 966 cm$^{-1}$, calculating a value of $A'_{699}/A'_{966}$, and recording the value as an aging SBS copolymer index $I_{B/S}$; and detecting the absorbance of the laboratory-fabricated SBS-modified asphalt or in-service SBS-modified asphalt pavement samples at 1030 cm$^{-1}$, 1456 cm$^{-1}$, 1600 cm$^{-1}$, and 1700 cm$^{-1}$, calculating functional group indexes of sulfoxide group, aliphatic group, aromatic group and carbonyl of the aged SBS-modified asphalt, and recording the same as indexes of aged neat asphalt $SI=A'_{1030}/\Sigma A'_{650-2000}$, $I_{B,a}I=A'_{1456}/\Sigma A'_{650-2000}$, $ARI=A'_{1600}/\Sigma A'_{650-2000}$, and $CI=A'_{1700}/E A'_{650-2000}$; and (3) delineating three aging stages of SBS-modified asphalt according to changes of external spectral characteristic functional group indexes obtained by actual detection and calculation:

a, an SBS polymer swelling stage:

$$0 < \frac{I_{B0/S0}}{I_{B/S}} \leq 1$$

&

$$0 < \frac{SI}{SI_0} - \frac{I_{B,a}I}{I_{B,a}I_0} - \frac{ARI}{ARI_0} + \frac{CI}{CI_0} \leq 2;$$

b, an SBS polymer degradation stage:

$$\frac{I_{B0/S0}}{I_{B/S}} > 1$$

&

$$0 < \frac{SI}{SI_0} - \frac{I_{B,a}I}{I_{B,a}I_0} - \frac{ARI}{ARI_0} + \frac{CI}{CI_0} \leq 2;$$

and c, an asphalt component imbalance stage:

$$\frac{I_{B0/S0}}{I_{B/S}} > 1$$

&

$$\frac{SI}{SI_0} - \frac{I_{B,a}I}{I_{B,a}I_0} - \frac{ARI}{ARI_0} + \frac{CI}{CI_0} > 2.$$

Preferably, in step (1), unaged SBS-modified asphalt liquid samples are detected by using an FTIR transmission module.

Preferably, in step (2), laboratory-fabricated SBS-modified asphalt liquid samples are detected by using the FTIR transmission module.

Preferably, in-service SBS-modified asphalt solid samples are detected by an FTIR-Diffuse Reflectance (DR) module.

Preferably, a scanning range of infrared spectrum wave number of FTIR test of asphalt samples in step (2) is 400 cm$^{-1}$–4000 cm$^{-1}$, and scanning times are 32.

Preferably, in actual application, according to the three stages of the aging stages of SBS-modified asphalt in step (3), the following maintenance measures are taken for the laboratory-fabricated SBS-modified asphalt and the in-service SBS-modified asphalt pavement respectively:

a, without taking any maintenance measures when the laboratory-fabricated SBS-modified asphalt or the in-service SBS-modified asphalt pavement is in the SBS polymer swelling stage;

b, adding an SBS copolymer linker to the laboratory-fabricated SBS-modified asphalt, and without taking any maintenance measures for the SBS-modified asphalt pavement when the laboratory-fabricated SBS-modified asphalt or the in-service SBS-modified asphalt pavement is in the SBS polymer degradation stage; and c, adding the SBS copolymer linker and neat asphalt rejuvenator to the laboratory-fabricated SBS-modified asphalt, and taking maintenance measures including paving micro-overlay, on-site recycling or hot mixing recycling for the SBS-modified asphalt pavement when the laboratory-fabricated SBS-modified asphalt or the in-service SBS-modified asphalt pavement is in the asphalt component imbalance stage.

The present disclosure provides a detection and analysis method for rapid delineation of aging stages of SBS-modified asphalt, which has the following advantages compared with the prior art.

(1) According to the detection and analysis method for rapid delineation of aging stages of SBS-modified asphalt provided by the present disclosure, three aging stages of SBS-modified asphalt are delineated, including SBS polymer swelling, SBS copolymer degradation and neat asphalt component imbalance through changes of the SBS copolymer and neat asphalt infrared spectrum characteristic functional groups; the actual aging stages of SBS-modified asphalt is delineated according to the actually detected and calculated aging functional group indexes; and the aging stage of SBS-modified asphalt is accurately determined according to quantitative detection indexes.

(2) According to the detection and analysis method for rapid delineation of aging stages of SBS-modified asphalt provided by the present disclosure, different forms of asphalt samples are detected using corresponding FTIR detection modules. This process allows infrared rays to penetrate the asphalt samples completely, resulting in a high detection accuracy. Accordingly, the disadvantages produced in a traditional ATR-FTIR asphalt detection module are prevented, involving the easy generation of scattering effect, low detection accuracy, and multiple detections to determine the changes of asphalt functional groups.

(3) According to the detection and analysis method for rapid delineation of aging stages of SBS-modified asphalt provided by the present disclosure, there is no need for large-scale core drilling and sampling on site for asphalt pavement. The aging stage of the in-service SBS-modified asphalt pavement is accurately determined and delineated only by scraping a small amount of asphalt on the surface or drilling to obtain asphalt samples in different depth ranges of the asphalt pavement. The overall structural stability of original asphalt pavement is hardly affected.

(4) According to the detection and analysis method for rapid delineation of aging stages of SBS-modified asphalt provided by the present disclosure, appropriate maintenance methods, including spraying recycling agent, paving microoverlay, in-situ regeneration or milling regeneration, are adopted according to the aging stages obtained from actual detection, maximizing the service life and service level of the in-service asphalt pavement.

DETAILED DESCRIPTION

Figure 1:
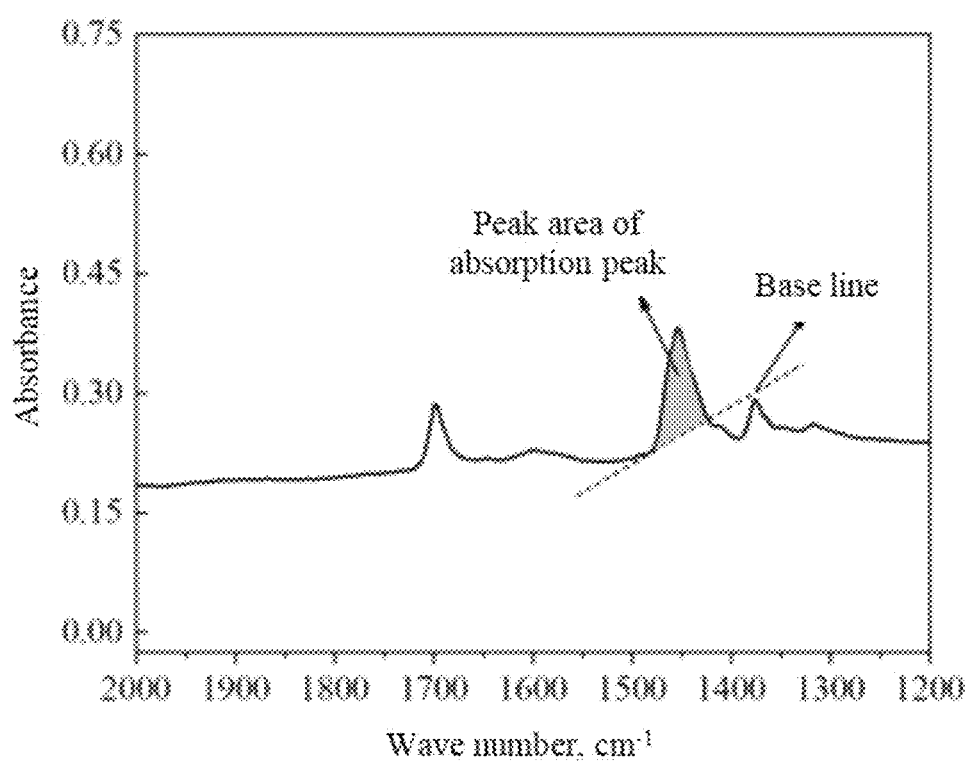
FIG. 1 is a schematic diagram for calculating the peak area of an absorption peak of Fourier infrared spectrum of asphalt in Example 2.
Figure 2:
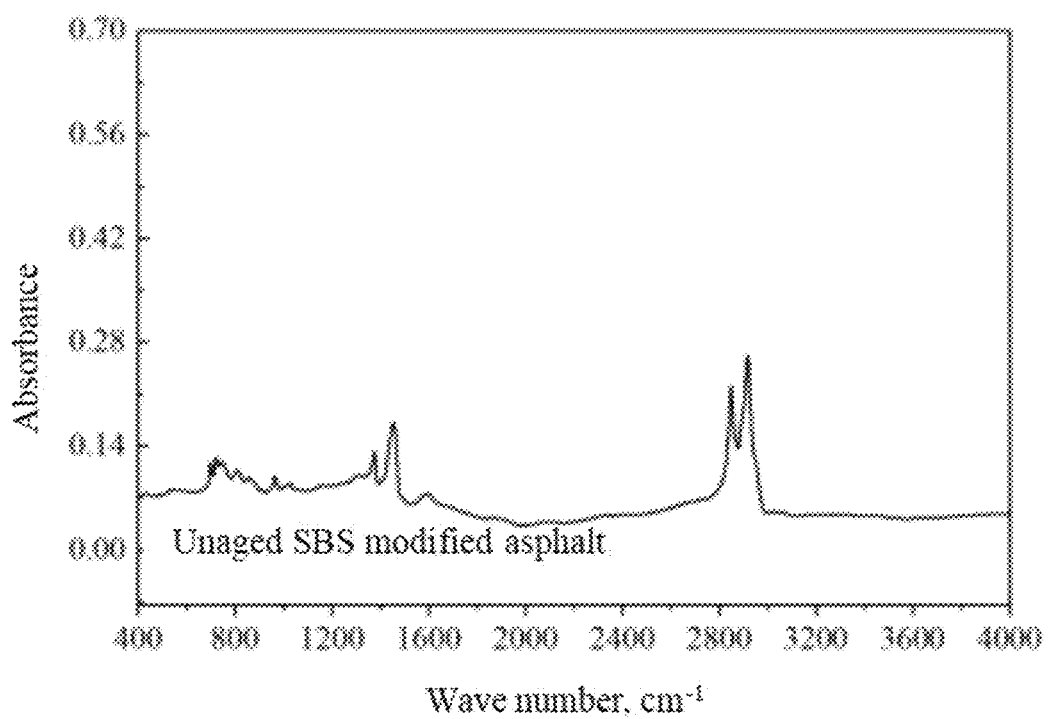
FIG. 2 is the test result of an infrared spectral absorption peak of unaged SBS-modified asphalt in Example 2.
Figure 3:
FIG. 3 is a sample diagram showing sampling from upper and middle layers on in-service SBS-modified asphalt pavement in Example 2.
Figure 4:
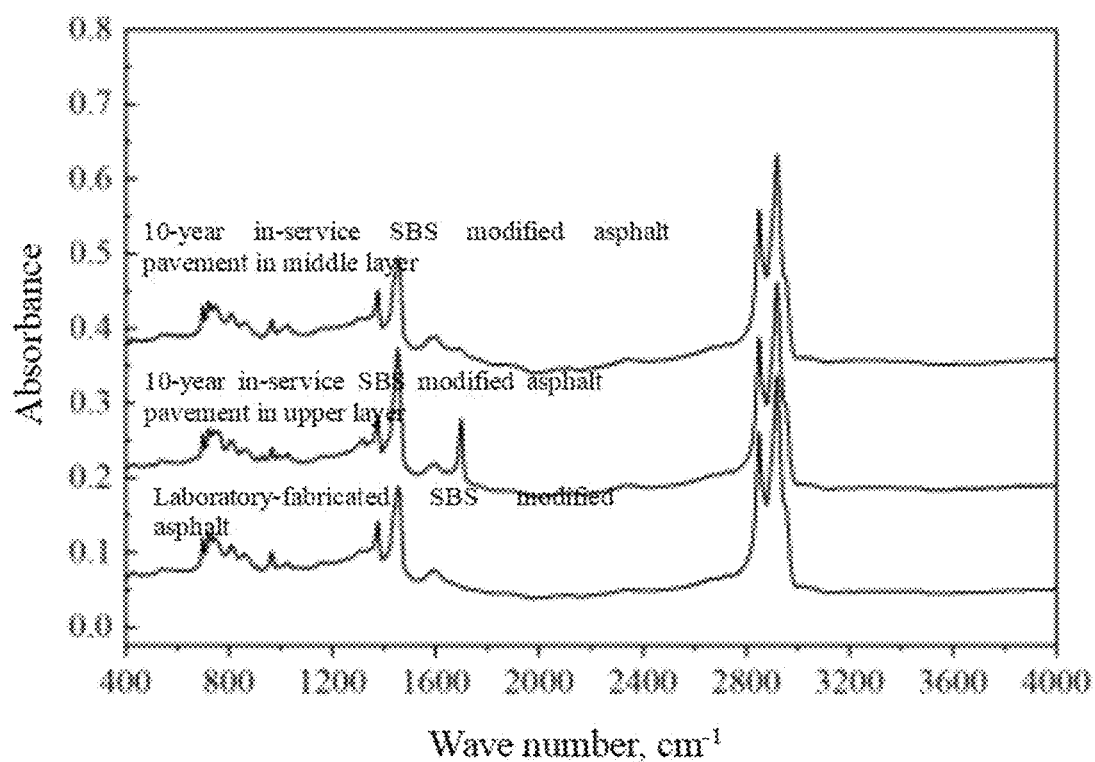
FIG. 4 is the test results of the infrared spectrum absorption peak of SBS-modified asphalt with different aging types in Example 2.

To make the objectives, technical solutions, and advantages of examples of the present disclosure more precise, the technical solutions in the examples of the present disclosure will be described clearly and completely in the following with reference to the examples of the present disclosure. Obviously, all the described examples are only some, rather than all examples of the present disclosure. On the basis of the examples in the present disclosure, all other examples obtained by those ordinary skilled in the art without creative efforts belong to the protection scope of the present disclosure.

Example 1

Rapid Delineation of the Aging Stages of SBS-Modified Asphalt (1) FTIR test is performed on unaged SBS-modified asphalt samples by using an FTIR transmission module, the absorbance of infrared spectrum characteristic functional groups polystyrene and polybutadiene of unaged SBS-modified asphalt at 699 $cm^{-1}$ and 966 $cm^{-1}$ are detected, and a ratio $A_{699}/A_{966}$ is calculated, which is recorded as an unaged SBS copolymer index $I_{B0/S0}$. In the same way, the absorbance of the unaged SBS-modified asphalt at 1030 $cm^{-1}$, 1456 $cm^{-1}$, 1600 $cm^{-1}$, and 1700 $cm^{-1}$ are detected, and functional group indexes of sulfoxide group, aliphatic group, aromatic group and carbonyl of the unaged SBS-modified asphalt are calculated, which are recorded as unaged neat asphalt indexes $SI_0=A_{1030}/\Sigma A_{650\sim2000}$, $I_{B,a}I_0=A_{1456}/\Sigma A_{650\sim2000}$, $ARI_0=A_{1600}/\Sigma A_{650\sim2000}$, and $CI_0=A_{1700}/\Sigma A_{650\sim2000}$.

A699, A966, A1030, A1456, A1600, and A1700 refer to corresponding peak areas at infrared spectrum wave numbers of 699 $cm^{-1}$, 966 $cm^{-1}$, 1030 $cm^{-1}$, 1456 $cm^{-1}$, 1600 $cm^{-1}$, and 1700 $cm^{-1}$, and $\Sigma A650\sim2000$ refer to a sum of peak areas at infrared spectrum wave numbers of 650 $cm^{-1}$–2000 $cm^{-1}$.

(2) The FTIR test is performed on laboratory-fabricated SBS-modified asphalt samples or in-service SBS-modified asphalt pavement samples, and the laboratory-fabricated SBS-modified asphalt samples are liquid, which are detected using the FTIR transmission module. An infrared spectrum wave number scanning range of the FTIR test of asphalt samples is 400 $cm^{-1}$–4000 $cm^{-1}$, and scanning times are 32. The in-service SBS-modified asphalt pavement samples are solid and are detected using an FTIR-DR module. The absorbance of the laboratory-fabricated SBS-modified asphalt or the in-service SBS-modified asphalt pavement samples are detected at 699 $cm^{-1}$ and 966 $cm^{-1}$, and a value of $A'_{699}/A'_{966}$ is calculated, which is recorded as an aging SBS copolymer index $I_{B/S}$. The absorbance of the laboratory-fabricated SBS-modified asphalt or the in-service SBS-modified asphalt pavement samples is detected at 1030 $cm^{-1}$, 1456 $cm^{-1}$, 1600 $cm^{-1}$, and 1700 $cm^{-1}$. The functional group indexes of the sulfoxide group, aliphatic group, aromatic group and carbonyl of aged SBS-modified asphalt are calculated, which are recorded as aged neat asphalt indexes $SI=A'_{1030}/\Sigma A'_{650\sim2000}$, $I_{B,a}I=A'_{1456}/\Sigma A'_{650\sim2000}$, $ARI=A'_{1600}/\Sigma A'_{650\sim2000}$, and $CI=A'_{1700}/EA'_{650\sim2000}$.

(3) Three aging stages of SBS-modified asphalt are delineated according to changes of infrared spectrum characteristic functional group indexes obtained by actual detection and calculation:

a, an SBS polymer swelling stage:

$$0 < \frac{I_{B0/S0}}{I_{B/S}} \leq 1$$

&

$$0 < \frac{SI}{SI_0} - \frac{I_{B,a}I}{I_{B,a}I_0} - \frac{ARI}{ARI_0} + \frac{CI}{CI_0} \leq 2;$$

b, an SBS polymer degradation stage:

$$\frac{I_{B0/S0}}{I_{B/S}} > 1$$

&

$$0 < \frac{SI}{SI_0} - \frac{I_{B,a}I}{I_{B,a}I_0} - \frac{ARI}{ARI_0} + \frac{CI}{CI_0} \leq 2;$$

and c, an asphalt component imbalance stage:

$$\frac{I_{B0/S0}}{I_{B/S}} > 1$$

&

$$\frac{SI}{SI_0} - \frac{I_{B,a}I}{I_{B,a}I_0} - \frac{ARI}{ARI_0} + \frac{CI}{CI_0} > 2.$$

(4) In practical application, according to the three stages of the aging stages of SBS-modified asphalt, the following maintenance measures are taken for the laboratory-fabricated SBS-modified asphalt and the in-service SBS-modified asphalt pavement respectively:

a, no maintenance measures are to be taken when the laboratory-fabricated SBS-modified asphalt or the in-service SBS-modified asphalt pavement is in the SBS polymer swelling stage;

b, an SBS copolymer linker is added to the laboratory-fabricated SBS-modified asphalt, and no maintenance measures are taken for the SBS-modified asphalt pavement when the laboratory-fabricated SBS-modified asphalt or the in-service SBS-modified asphalt pavement is in the SBS polymer degradation stage; and c, the SBS copolymer linker and neat asphalt rejuvenator are added to the laboratory-fabricated SBS-modified asphalt, and maintenance measures including paving micro-overlay, on-site recycling or hot mixing recycling are taken for the SBS-modified asphalt pavement when the laboratory-fabricated SBS-modified asphalt or the in-service SBS-modified asphalt pavement is in the asphalt component imbalance stage.

Example 2

Actual Detection According to the Delineation Method of Example 1 Described Above
1. Acquisition of Raw Materials Samples are taken from an SBS-modified asphalt mixing barrel of an asphalt manufacturer in Hubei Province. The samples are taken immediately after the SBS-modified asphalt is prepared, before swelling and development, and recorded as the unaged SBS-modified asphalt.

Samples are taken from an oil unloading tank of an asphalt mixing station in Hubei Province, and the samples are taken immediately when a tank asphalt truck discharges half of the asphalt.

Finally, on the pavement of an expressway in Hubei Province, samples of SBS-modified asphalt in the middle and upper layers with a service life of about 10 years are obtained. When sampling in-service SBS-modified asphalt, surface asphalt is scraped by using a scraper from the upper layer, the middle layer is drilled by using a small core-drilling machine, and scattered asphalt bulk particles are taken. The whole sampling from in-service asphalt pavement is fast and convenient, and basically has no apparent adverse effects on the structural stability of asphalt pavement.

2. Detection of Raw Materials

After obtaining the above four types of asphalt samples, different FTIR detection modules detect the infrared spectral absorption peaks of asphalt samples according to asphalt forms.

The absorbance of infrared spectrum characteristic functional groups polystyrene and polybutadiene of unaged SBS copolymer at 699 $cm^{-1}$ and 966 $cm^{-1}$ are detected by the FTIR transmission module, and a ratio $A_{699}/A_{966}$ is calculated, which is recorded as an unaged SBS copolymer index $I_{B0/S0}$; and the absorbance of infrared spectrum characteristic functional groups of neat asphalt at 1030 $cm^{-1}$, 1456 $cm^{-1}$, 1600 $cm^{-1}$, and 1700 $cm^{-1}$ are detected, and functional group indexes of sulfoxide group, aromatic group and carbonyl group of unaged neat asphalt are calculated, which are recorded as $SI_0=A_{1030}/\Sigma A_{650-2000}$, $I_{B,a}I_0=A_{1456}/\Sigma A_{650-2000}$, $ARI_0=A_{1600}/\Sigma A_{650-2000}$, and $CI_0=A_{1700}/\Sigma A_{650-2000}$. The calculation results are shown in Table 1 below.

TABLE 1

Calculation results of functional group indexes of unaged SBS-modified asphalt

| Types of asphalt | $I_{B0/S0}$ | $SI_0$ | $I_{B,a}I_0$ | $ARI_0$ | $CI_0$ |
|---|---|---|---|---|---|
| Unaged SBS-modified asphalt | 0.75 | 0.05 | 0.25 | 0.14 | 0.03 |

An FTIR test is performed on laboratory-fabricated SBS-modified asphalt or in-service SBS-modified asphalt pavement samples, the laboratory-fabricated SBS-modified asphalt samples are detected by the FTIR transmission module, and the in-service SBS-modified asphalt samples are detected by an FTIR-DR module. The absorbance of the laboratory-fabricated SBS-modified asphalt or the in-service SBS-modified asphalt pavement samples at 699 $cm^{-1}$ and 966 $cm^{-1}$ are calculated, and a ratio $A'_{699}/A'_{966}$ is calculated, which is recorded as aging SBS copolymer index $I_{B/S}$. The absorbance at 1030 $cm^{-1}$, 1456 $cm^{-1}$, 1600 $cm^{-1}$, and 1700 $cm^{-1}$ are calculated, and the functional group indexes of sulfoxide group, aromatic group, and carbonyl of aging neat asphalt are calculated, which are recorded as $SI_0=A'_{1030}/\Sigma A'_{650-2000}$, $I_{B,a}I=A'_{1456}/\Sigma A'_{650-2000}$, $ARI=A'_{1600}/\Sigma A'_{650-2000}$, and $CI=A'_{1700}/\Sigma A'_{650-2000}$. The calculation results are shown in Table 2 below.

TABLE 2

Calculation results of functional group indexes of laboratory-fabricated SBS-modified asphalt and in-service SBS-modified asphalt

| Types of asphalt | $I_{B/S}$ | SI | $I_{B,a}I$ | ARI | CI |
|---|---|---|---|---|---|
| Laboratory-fabricated SBS-modified asphalt | 0.72 | 0.06 | 0.23 | 0.14 | 0.03 |
| SBS-modified asphalt in the upper layer | 0.48 | 0.11 | 0.15 | 0.09 | 0.08 |
| SBS-modified asphalt in the middle layer | 0.62 | 0.07 | 0.19 | 0.12 | 0.06 |

According to the detected functional group indexes of the laboratory-fabricated SBS-modified asphalt and the in-service SBS-modified asphalt, the aging stages of SBS-modified asphalt is delineated into three stages, as shown in Table 3 below.

TABLE 3

Aging stages of laboratory-fabricated SBS-modified asphalt and in-service SBS-modified asphalt

| Types of asphalt | $\dfrac{I_{B0/S0}}{I_{B/S}}$ | $\dfrac{SI}{SI_0} - \dfrac{I_{B,a}I}{I_{B,a}I_0} - \dfrac{ARI}{ARI_0} + \dfrac{CI}{CI_0}$ | Aging stages |
|---|---|---|---|
| Laboratory-fabricated SBS-modified asphalt | 1.04 | 0.28 | SBS polymer degradation stage |
| SBS-modified asphalt in the upper layer | 1.63 | 3.62 | Asphalt component imbalance stage |
| SBS-modified asphalt in the middle layer | 1.21 | 1.78 | SBS polymer degradation stage |

According to the above detection results, an appropriate amount of SBS copolymer linker will be added to the laboratory-fabricated SBS-modified asphalt. It is suggested that the in-service asphalt pavement to be covered with micro-overlay to prolong the service life of the pavement and improve the service level of the pavement.

It is to be noted that relational terms, relational terms including first and second, and the like, may be used herein to distinguish one entity or orientation from another entity or orientation without necessarily requiring or implying any actual such relationship or order between the entities or orientations. Furthermore, the terms "including", "comprising", or any other variations thereof are intended to cover non-exclusive inclusion so that a process, method, article, or apparatus including a series of elements includes not only those elements but also other elements not explicitly listed, or elements inherent to such process, method, article, or apparatus. In the absence of more restrictions, an element defined by the phrase "including a . . . " does not exclude the presence of additional identical elements in the process, method, article, or apparatus that includes the element.

The above examples are only used to illustrate the technical solutions of the present disclosure, rather than limiting the present disclosure. Although the present disclosure has been described in detail concerning the foregoing examples, those ordinary skilled in the art will understand that the technical solutions disclosed in the above examples can still be modified, or equivalents can replace some of the technical features. These modifications and substitutions do not make the essence of the corresponding technical solutions depart from the spirit and scope of the technical solutions of various examples of the present disclosure.

The invention claimed is:

1. A detection and analysis method for rapid delineation of aging stages of styrene-butadiene-styrene (SBS) modified asphalt, comprising the following steps:

(1) performing a Fourier transform infrared spectroscopy (FTIR) test on unaged SBS-modified asphalt samples, detecting the absorbance of infrared spectrum characteristic functional groups polystyrene and polybutadiene of unaged SBS-modified asphalt at 699 cm$^{-1}$ and 966 cm$^{-1}$, calculating a value of $A_{699}/A_{966}$, and recording the value as an unaged SBS copolymer index $I_{B0/S0}$; and detecting the absorbance of the unaged SBS-modified asphalt at 1030 cm$^{-1}$, 1456 cm$^{-1}$, 1600 cm$^{-1}$, and 1700 cm$^{-1}$, calculating functional group indexes of sulfoxide group, aliphatic group, aromatic group and carbonyl of the unaged SBS-modified asphalt, and recording the same as indexes of unaged neat asphalt $SI_0=A_{1030}/\Sigma A_{650-2000}$, $I_{B,a}I_0=A_{1456}/\Sigma A_{650-2000}$, $ARI_0=A_{1600}/\Sigma A_{650-2000}$, and $CI_0=A_{1700}/\Sigma A_{650-2000}$;

$A_{699}$, $A_{966}$, $A_{1030}$, $A_{1456}$, $A_{1600}$, and $A_{1700}$ referring to corresponding peak areas at infrared spectrum wave numbers of 699 cm$^{-1}$, 966 cm$^{-1}$, 1030 cm$^{-1}$, 1456 cm$^{-1}$, 1600 cm$^{-1}$, and 1700 cm$^{-1}$, and $\Sigma A_{650-2000}$ referring to a sum of peak areas at infrared spectrum wave numbers of 650 cm$^{-1}$–2000 cm$^{-1}$;

(2) performing the FTIR test on laboratory-fabricated SBS-modified asphalt samples or in-service SBS-modified asphalt pavement samples; detecting the absorbance of the laboratory-fabricated SBS-modified asphalt or in-service SBS-modified asphalt pavement samples at 699 cm$^{-1}$ and 966 cm$^{-1}$, calculating a value of $A'_{699}/A'_{966}$, and recording the value as an aging SBS copolymer index $I_{B/S}$; and detecting the absorbance of the laboratory-fabricated SBS-modified asphalt or in-service SBS-modified asphalt pavement samples at 1030 cm$^{-1}$, 1456 cm$^{-1}$, 1600 cm$^{-1}$, and 1700 cm$^{-1}$, calculating functional group indexes of sulfoxide group, aliphatic group, aromatic group and carbonyl of the aged SBS-modified asphalt, and recording the same as indexes of aged neat asphalt $SI=A'_{1030}/\Sigma A'_{650-2000}$, $I_{B,a}I=A'_{1456}/\Sigma A'_{650-2000}$, $ARI=A'_{1600}/\Sigma A'_{650-2000}$, and $CI=A'_{1700}/\Sigma A'_{650-2000}$; and (3) delineating three aging stages of SBS-modified asphalt according to changes of infrared spectrum characteristic functional group indexes obtained by actual detection and calculation:

a, an SBS polymer swelling stage:

$$0 < \frac{I_{B0/S0}}{I_{B/S}} \leq 1$$

&

$$0 < \frac{SI}{SI_0} - \frac{I_{B,a}I}{I_{B,a}I_0} - \frac{ARI}{ARI_0} + \frac{CI}{CI_0} \leq 2;$$

b, an SBS polymer degradation stage:

$$\frac{I_{B0/S0}}{I_{B/S}} > 1$$

&

$$0 < \frac{SI}{SI_0} - \frac{I_{B,a}I}{I_{B,a}I_0} - \frac{ARI}{ARI_0} + \frac{CI}{CI_0} \leq 2;$$

and c, an asphalt component imbalance stage:

$$\frac{I_{B0/S0}}{I_{B/S}} > 1$$

&

$$\frac{SI}{SI_0} - \frac{I_{B,a}I}{I_{B,a}I_0} - \frac{ARI}{ARI_0} + \frac{CI}{CI_0} > 2.$$

2. The detection and analysis method for rapid delineation of aging stages of SBS-modified asphalt according to claim 1, wherein in step (1), liquid samples from unaged SBS-modified asphalt are detected using an FTIR transmission module.

3. The detection and analysis method for rapid delineation of aging stages of SBS-modified asphalt according to claim 1, wherein in step (2), liquid samples from laboratory-fabricated SBS-modified asphalt are detected using the FTIR transmission module.

4. The detection and analysis method for rapid delineation of aging stages of SBS-modified asphalt according to claim 1, wherein in step (2), solid samples from in-service SBS-modified asphalt are detected using an FTIR-Diffuse Reflectance (DR) module.

5. The detection and analysis method for rapid delineation of aging stages of SBS-modified asphalt according to claim 1, wherein a scanning range of infrared spectrum wave number for FTIR test of asphalt samples in step (2) is 400 cm$^{-1}$–4000 cm$^{-1}$, with a total of 32 scans.

6. The detection and analysis method for rapid delineation of aging stages of SBS-modified asphalt according to claim 1, wherein in practical application, according to the three aging stages of SBS-modified asphalt delineated in step (3), the following maintenance measures are implemented for the laboratory-fabricated SBS-modified asphalt and in-service SBS-modified asphalt pavements respectively:

a, requiring no maintenance measures in a case that the laboratory-fabricated SBS-modified asphalt pavement or the in-service SBS-modified asphalt pavement is in the SBS polymer swelling stage;

b, adding an SBS copolymer linker to the laboratory-fabricated SBS-modified asphalt, and requiring no maintenance measures for the SBS-modified asphalt pavement in a case that the laboratory-fabricated SBS-modified asphalt pavement or the in-service SBS-modified asphalt pavement is in the SBS polymer degradation stage; and c, adding the SBS copolymer linker and neat asphalt rejuvenator to the laboratory-fabricated SBS-modified asphalt, and taking maintenance measures comprising paving micro-overlay, on-site recycling or hot mixing recycling for the SBS-modified asphalt pavement in a case that the laboratory-fabricated SBS-modified asphalt pavement or the in-service SBS-modified asphalt pavement is in the asphalt component imbalance stage.

* * * * *